(12) United States Patent
Alban et al.

(10) Patent No.: US 11,248,630 B2
(45) Date of Patent: Feb. 15, 2022

(54) LIQUID/GAS SEPARATOR AND CENTRIFUGAL MOTOR COMPRESSOR UNIT EQUIPPED WITH SUCH A SEPARATOR

(71) Applicant: Thermodyn SAS, Le Creusot (FR)

(72) Inventors: Thomas Alban, Le Creusot (FR); Yoann Vidalenc, Le Creusot (FR); Julien Renaud, Le Creusot (FR); Tiziano Pellegrini, Florence (IT); Sebastien Condom, Courbevoie (FR)

(73) Assignee: Thermodyn SAS, Le Creusot (FR)

( * ) Notice: Subject to any disclaimer, the term of this patent is extended or adjusted under 35 U.S.C. 154(b) by 108 days.

(21) Appl. No.: 15/556,042

(22) PCT Filed: Mar. 4, 2016

(86) PCT No.: PCT/EP2016/054699
§ 371 (c)(1),
(2) Date: Sep. 6, 2017

(87) PCT Pub. No.: WO2016/142306
PCT Pub. Date: Sep. 15, 2016

(65) Prior Publication Data
US 2018/0045224 A1    Feb. 15, 2018

(30) Foreign Application Priority Data

Mar. 6, 2015   (FR) ..................................... 1551908

(51) Int. Cl.
*F04D 29/70*     (2006.01)
*F04D 17/10*     (2006.01)
(Continued)

(52) U.S. Cl.
CPC ........... *F04D 29/706* (2013.01); *B01D 45/02* (2013.01); *B01D 45/08* (2013.01); *F04D 17/10* (2013.01);
(Continued)

(58) Field of Classification Search
CPC .... F04D 29/706; F04D 29/083; F04D 29/624; F04D 17/10; F04D 29/4206;
(Continued)

(56) References Cited

U.S. PATENT DOCUMENTS 5,044,440 A * 9/1991 Stinessen ................ E21B 43/36
166/344
6,299,672 B1 * 10/2001 Rivas .................. B01D 19/0042
166/105.5
(Continued)

FOREIGN PATENT DOCUMENTS

DE         10010077 A1    9/2001
GB          2226776 A     7/1990
(Continued)

OTHER PUBLICATIONS

French Search Report issued in connection with corresponding French application No. 1551908 dated Jan. 29, 2016.
(Continued)

*Primary Examiner* — Joseph J Dallo
*Assistant Examiner* — Scott A Reinbold
(74) *Attorney, Agent, or Firm* — Baker Hughes Patent Organization (57) ABSTRACT

This liquid/gas separator for centrifugal motor compressor includes a sump internally equipped with at least one gas separator stage suitable to separate a gaseous phase from a liquid phase accepted in the sump entry. The sump internally includes a compartment in which the gaseous phase is (Continued)

separated by a separator stage, and in which is assembled by a compressor stage of the motor compressor.

14 Claims, 6 Drawing Sheets (51) Int. Cl.
*F04D 29/42* (2006.01)
*F04D 29/62* (2006.01)
*B01D 45/02* (2006.01)
*B01D 45/08* (2006.01)
*F04D 29/08* (2006.01)
*F04D 25/06* (2006.01)
*B01D 19/00* (2006.01)
*F04D 29/28* (2006.01)
*F04D 29/58* (2006.01)

(52) U.S. Cl.
CPC ....... *F04D 29/083* (2013.01); *F04D 29/4206* (2013.01); *F04D 29/624* (2013.01); *B01D 19/0042* (2013.01); *B01D 19/0052* (2013.01); *F04D 25/06* (2013.01); *F04D 29/284* (2013.01); *F04D 29/582* (2013.01)

(58) Field of Classification Search
CPC ...... F04D 29/284; F04D 29/582; F04D 25/06; F04D 9/003; F04D 27/023; F04D 31/00; B01D 45/08; B01D 45/02; B01D 19/0042; B01D 19/0052; F01D 25/32; F05B 2210/132; F05D 2260/602; F05D 2260/6022

USPC ..................................................... 415/169.2
See application file for complete search history.

(56) References Cited

U.S. PATENT DOCUMENTS

| 6,688,117 B1 | 2/2004 | Ophir | |
| 2005/0178455 A1* | 8/2005 | Cancade | F16L 55/02718 138/39 |
| 2009/0100857 A1 | 4/2009 | Ophir | |
| 2011/0048546 A1* | 3/2011 | Bjorge | F04D 29/05 137/154 |
| 2014/0037422 A1* | 2/2014 | Gilarranz | F04D 29/5806 415/1 |

FOREIGN PATENT DOCUMENTS

| JP | 2003517557 A | 5/2003 | |
| JP | 2008531965 A | 8/2008 | |
| RU | 2184876 C1 | 7/2002 | |
| RU | 2289727 C2 | 12/2006 | |
| WO | 2007103248 A2 | 9/2007 | |
| WO | WO-2007103248 A2 * | 9/2007 | ......... B01D 19/0052 |
| WO | 2009131462 A2 | 10/2009 | |

OTHER PUBLICATIONS

International Search Report and Written Opinion issued in connection with corresponding PCT application PCT/EP2016/054699 dated May 20, 2016.

* cited by examiner

LIQUID/GAS SEPARATOR AND CENTRIFUGAL MOTOR COMPRESSOR UNIT EQUIPPED WITH SUCH A SEPARATOR

TECHNICAL FIELD

Embodiments of the invention generally relate to the field of centrifugal motor compressors and concerns, within a non-limiting application, the motor compressor units operating at relatively low powers. They can be, for example, just as an illustration, powers from 400 kW to 700 kW, and units meant to deliver in output, a gas compressed by a pressure, for example, from 25 to 30 bar, and flows, for example, up to 10,000 m³/hour.

For this type of functioning, the compression lines of the gas use the compressors functioning at a relatively low flow and are capable of providing relatively high pressure ratios.

BACKGROUND

It is known by one of ordinary skill in the art that motor compressors of relatively low power use a high speed electric engine, that is, of a rotation frequency higher than the frequency of the electric supply, and at low voltage, lesser than 1 kV, coupled with a single section compressor constituted of one or two wheels in an awkward position. The engine and the compressor are attached in a single body under pressure. The shaft line is typically supported by two radial magnetic bearings and an axial buttress. In this respect, organizations using a motor compressor are equipped with a centrifugal wheel acting as liquid/gas separator.

One may also refer to document WO2013/140184, which describes a motor compressor integrated in the conduct of gas to be compressed.

Embodiments of the present invention concern a motor compressor unit meant to be boarded on an ocean platform or on a floating unit of production, storage and unloading, generally described by the term FPSO (for "Floating Production Storage and Offloading"). When a motor compressor unit is meant to be installed on a platform or on a floating unit, its volume, especially its control on the ground, comprise a criterion which must be considered by the manufacturers of compression machines.

This problem is increasingly raised due to the presence, in upstream of the motor compressor unit, of a liquid/gas separator, which is meant to maintain the gas admitted in the motor compressor as dry as possible by preventing the intrusion of liquid phases in the compressor; which would be likely to pose problems of compressor damage, especially the wheels of the compressor, and more especially by erosion.

BRIEF DESCRIPTION

Hence, embodiments of the invention aim to overcome these disadvantages and propose a motor compressor unit having a reduced control on the ground, facilitate the maintenance operations, and reduce the amount of pressure lost between the separator and the motor compressor.

According to an embodiment of the present invention, the embodiment comprises a liquid/gas separator for a centrifugal motor compressor, including a sump internally equipped with at least one gas separator level apt to separate a gaseous phase and a liquid phase admitted within the sump.

The compressor stage, which is configured to receive at least one part of the separated gaseous phase, is thus integrated to the separator allowing the entire volume to considerably reduce its control on the ground.

According to another characteristic of the liquid/gas separator, a compartment is closed by a blockage slab attached to the motor compressor and fixed to the sump.

Fortunately, the compartment is airtight with respect to the exterior of the sump, and has an airtight seal placed between the blockage slab and the sump.

Fortunately, internally, the sump is configured to guide the gaseous phase in the compartment at the place where an entry of the stage of the compressor has been assembled.

In an execution mode, the separator includes cooling methods via recirculated gas and/or suppressed gas in upstream by a motor compressor or another gas handled by the motor compressor, and where the means of cooling are provided around the sump. The cooling system could be installed by suction or by suppression of the motor compressor unit.

In an execution mode, the separator is placed vertically and can include a single compressor level.

However, in different execution modes, the separator can include at least one separator chosen among a cyclonic, double bend, or inertial separator.

Embodiments of the invention also have a centrifugal motor compressor unit, including a motor compressor having a motor method leading to the rotation of a compressor, and a separator as defined above, where the compressor is integrated in the separator.

Fortunately, a set of active magnetic bearings axially and radially support the shaft line of the motor compressor.

In an execution mode, the compressor has axial backflow and includes a bent exit apt to allow the extraction of the compressor.

Fortunately, the motor method and the compressor are then assembled in a common sump airtight against the gas handled by the motor compressor, which is fixed in an airtight manner in the sump of the separator.

The compressor can still be a compressor with radial backflow and include a radial exit, with all of it including the motor method and a wheel with a compression blade of the compressor constituting a set that could be disassembled.

In an execution mode, the motor compressor unit includes, assembled in a common sump, a motor compressor set, a separator, double partition cooling systems, an anti-pumping valve, and methods of controlling the motor compressor unit.

BRIEF DESCRIPTION OF THE DRAWINGS

These and other features, characteristics and advantages of the embodiments of the present invention will become better understood when the following description, given only as a non-limitative example, and in reference to the accompanying drawings appended on which.

DETAILED DESCRIPTION

Figure 1:
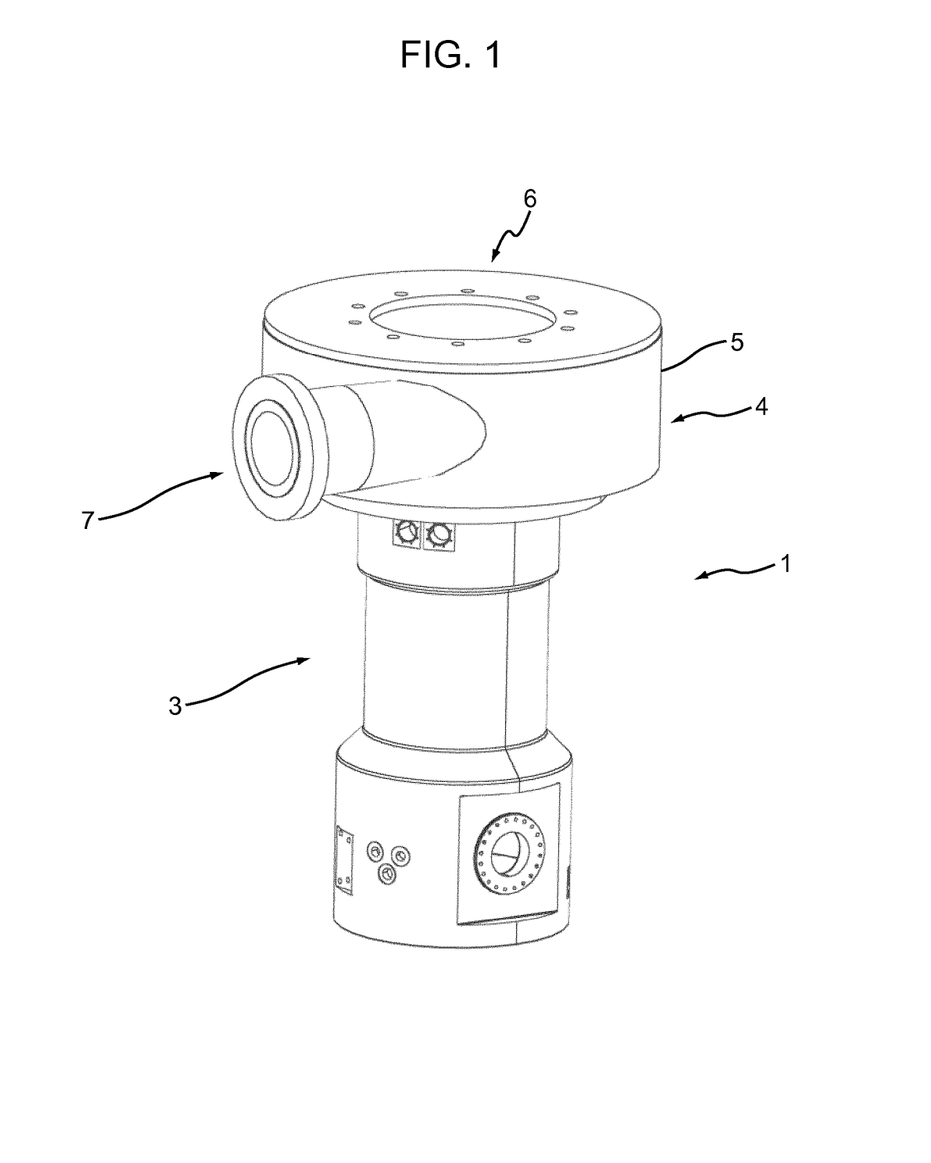
FIG. 1 is a perspective view of a motor compressor compliant with the invention.
Figure 2:
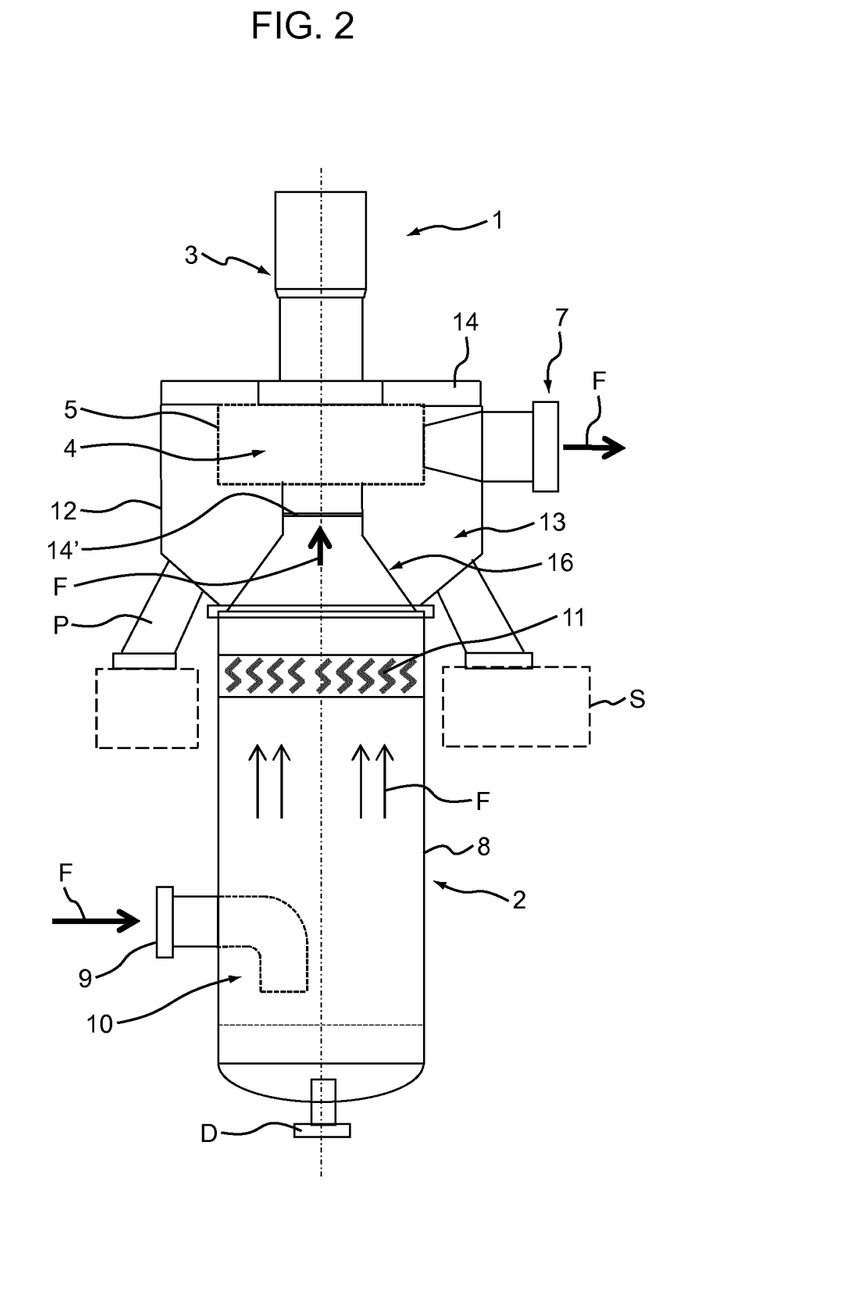
FIG. 2 is a diagrammatic view of an example of execution of a motor compressor with a radial backflow, integrated to a separator according to an example of execution of the invention.
Figure 3:
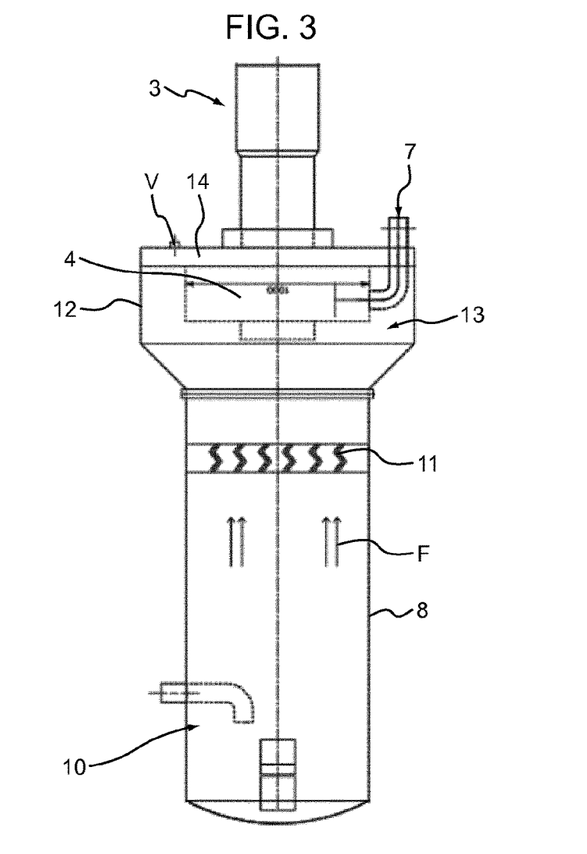
FIG. 3 is a diagrammatic view of an example of execution of a motor compressor with an axial backflow, integrated to a separator according to an example of execution of the invention.

In FIGS. 1-3, a unit compliant with an embodiment of the present invention is illustrated, including a compressor 1, such as a centrifugal motor compressor set as illustrated in FIG. 1, and a liquid/gas separator 2, or purifier, visible in FIGS. 2 and 3. It should be noted that the terms, "compressor", "motor compressor" and "engine compressor" are intended to be synonymous and interchangeable in the sense that all represent the compressor component of the embodiments described herein where a compressor component is present, and as such, said terms are collectively designated by the reference numeral "1" in the specification and figures.

The motor compressor unit is meant to be mounted on an ocean platform or on a FPSO platform.

To be described in detail, by reducing the control of the ground of the motor compressor unit, the motor compressor is integrated to the separator. More particularly, the compression stage of the motor compressor is integrated to the separator.

The motor compressor 1 mainly includes a motor 3, constituted for example by a high speed electric engine, that is, at a frequency of rotation higher than the frequency of the electric supply, leading to the rotation of a shaft line that is rigidly mounted on one or more wheels with blades, for example, by means of a Hirth joint.

In the illustrated application, the motor compressor 1 includes a single stage of compression 4, including a single wheel with blades mounted on the shaft line.

The compression stage 4 notably includes a compressor sump 5, which is placed on the compression wheel with blades and includes an axial or radial inlet 6 for admission of gas in the motor compressor, and an outlet or exit 7 by which the compressed gas is delivered in an output by the motor compressor.

In the examples represented, inlet 6 is axial.

In the execution mode of FIG. 2, the outlet of the motor compressor is radial, even though in the execution mode of FIG. 3, the outlet is axial, that is, parallel to the general axis of the motor compressor.

In the expected application, the gas admitted into the motor compressor unit is a humid gas, that is, a gas including a liquid phase constituted of liquid particles in suspension in the gas.

With the aim of preventing the introduction of ambient humidity in the compressor stage, the gas is first separated by the separator 2 before being delivered to the axial inlet 6 of the compressor stage 4.

The liquid/gas separator 2 thus includes a sump 8, here in an overall cylindrical form, including an entry 9 by which the humid gas travels across the separation stages until it is sucked in by the motor compressor.

By considering the direction of dispersal of the gaseous flows (arrows F), the liquid/gas separator includes, for example, a first separator stage 10 in which the liquid particles are separated by differentiation from the quantity of the movement then by gravity, then, for example, a second separator stage 11 including a set of obstacles distributed on the journey of the gaseous flow, provided in downstream of the first stage.

Alternatively, the second stage 11 can be cyclonic. More particularly, the second stage 11 can include several separation stages.

Alternatively, the liquid/gas separator of the first stage can be inertial.

The separator stages provided in the sump 8 constituted by the elements are known to a worker in the trade. Hence, they shall not be described in detail below.

We shall, however, note that they are adapted for separating the liquid and the gaseous phases, which are accepted in the separator 2 so as to issue a dry gas at the compressor stage 4 in downstream of the second stage 11.

A drain D allows evacuation of the liquid present in the depth of the separator.

As illustrated by FIGS. 2 and 3, in order to allow the integration of the motor compressor to the separator, the sump 8 of the separator includes a head 12, with an overall cylindrical shape and enlarged diameter, dispersed in the gaseous phase and separated by the separator stages 10 and 11, and which internally delimits a compartment 13 in which it is assembled in the compressor stage 4. This head 12 is located at the opposite end to that of entry 9 of the separator.

The motor compressor is equipped with a blockage slab 14, which is fixed with the help of screws or pins V (visible in FIG. 3) on the head 12 so that the compressor stage 4 is positioned in the compartment 13 on the journey of the dry gas flow.

As represented in FIGS. 2 and 3, a diffuser 16 is provided for channeling the gaseous flows to the compressor stage, executed, for example, in the form of a truncated cone surface converging towards the inlet 6 of engine compressor 1, as well as a perforated slab 14' allowing the correction of the flow from the separator to the double bend.

The motor compressor can be integrated to the separator according to the two geometric configurations, and according to the radial or axial direction of the backflow. In the two backflow configurations, all that is constituted by the separator and the motor compressor can be positioned vertically or horizontally.

Figure 4:
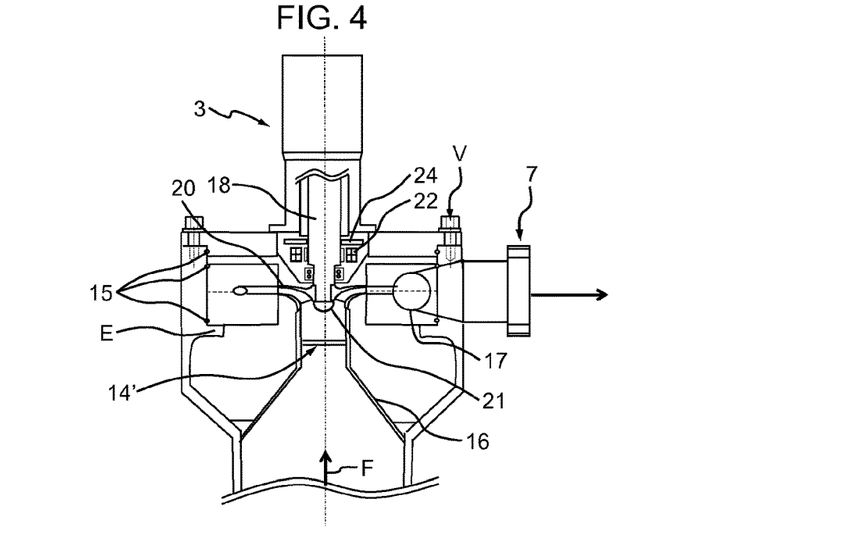
FIG. 4 is a detailed view of the motor compressor of FIG. 2.

By referring to FIG. 2 and FIG. 4, which illustrate an execution detail of the motor compressor integrated to the separator, in a radial backflow configuration, the motor compressor adopts a modular configuration and includes a volute 17 that opens in the outlet or exit 7 and is assembled internally on a flange E in the median part of the head 12 and fixed to the latter with the interposition of the airtight seals 15.

Motor 3, with its shaft line 18 fixed on a wheel with blades 20, constitutes a set that can be dismantled and assembled in a centered manner on the head 12 of the separator and on the volute 17.

The configuration of the end of the shaft line 18 is in the form of ogive 21 and is for channeling the gaseous flows.

Figure 5:
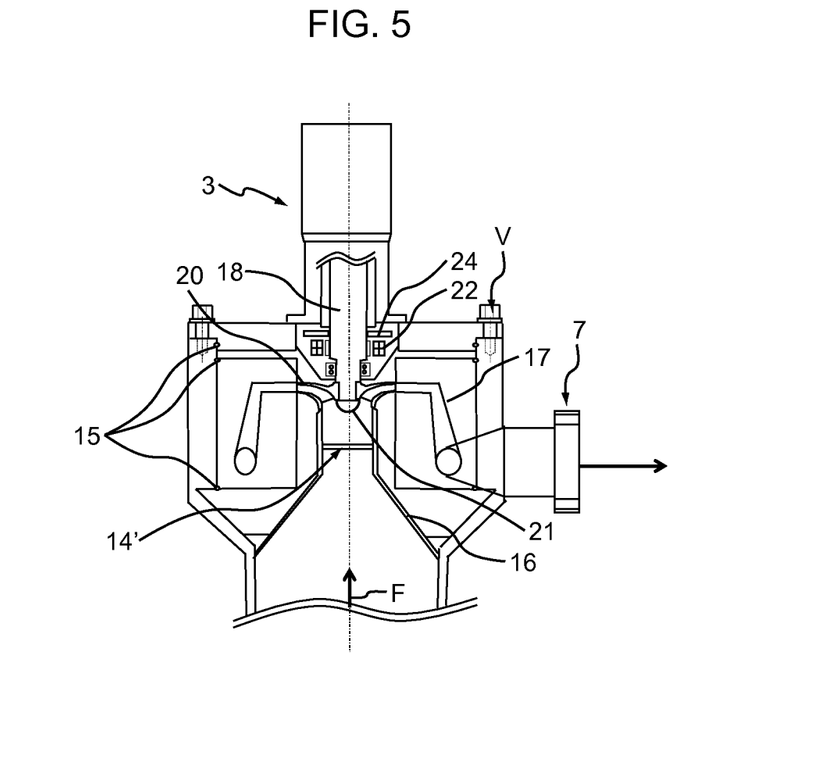
FIG. 5 illustrates another execution mode of the motor compressor of FIG. 2.

According to another implementation mode visible in FIG. 5, the volute 17 is extended according to a substantial part of the height of the head 12 and adopts a more easily executable asymmetrical shape.

Similar to the execution mode described in reference to FIG. 4, the engine, the shaft line and the centrifugal wheel constitute a set that can be dismantled and which is assembled in a centered manner on the head of the separator and on the volute.

The volute can also be dismantled.

As illustrated in FIG. 2, in the radial backflow configuration, the head 12 is equipped with bases P allowing the assembling of the motor engine unit on a support platform S.

Upon returning to FIG. 3, and as in all the configurations, the sump of the compressor and the motor are encapsulated in a common sump under pressure and seals the gas handled by the compressor.

The common sump also includes a blockage slab 14 which is fixed by screwing to the upper part of the separator head. As represented, exit 7 is curved in order to allow the assembling and disassembling of the motor and the compressor.

Due to the organization just described, the compressor stage 4 is integrated to the separator 2 and is placed in a sealed volume, whose pressure is that of the gas handled by the compressor and higher than the atmospheric pressure.

Thus, it is possible to execute the compressor sump 5 of the compressor stage with a reduced metal thickness, thus limiting the manufacturing costs of the compressor stage.

In the examples of execution described, the compressor and the electric engines are assembled in a common sealed sump. The motor is also pressurized between the suction and backflow pressures of the compressor.

Moreover, by using a completely airtight common sump for the motor and for the compressor, preventing any leak to the atmosphere allows for completely removing the airtight lining traditionally used.

Moreover, the motor compressor 1, comprises a compact execution including a rotor and a shaft line supported by active magnetic bearings.

Figure 6:
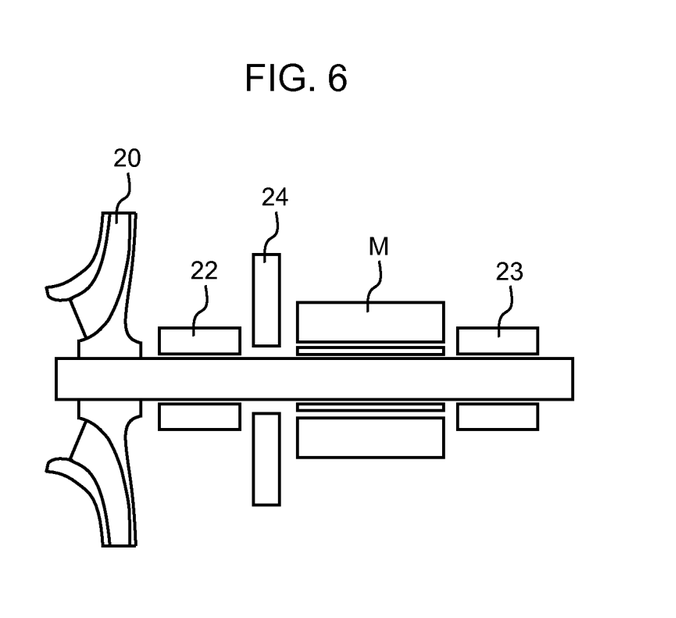
FIG. 6 illustrates the bearings of the shaft line of the motor compressors of FIGS. 1, 2, and 3.

More particularly, as illustrated by FIG. 6, which represents the shaft line 18 fixed on a centrifugal blade 20, we see that the shaft line of the motor compressor is radially supported by two bearings 22 and 23 positioned on either side of the active part of the motor M. Moreover, a single buttress 24 without oil, typically magnetic, maintains the shaft line 18 axially. This buttress 24 can be positioned between the radial bearings 22 and 23, as illustrated, or be positioned external to these bearings.

Figure 7:
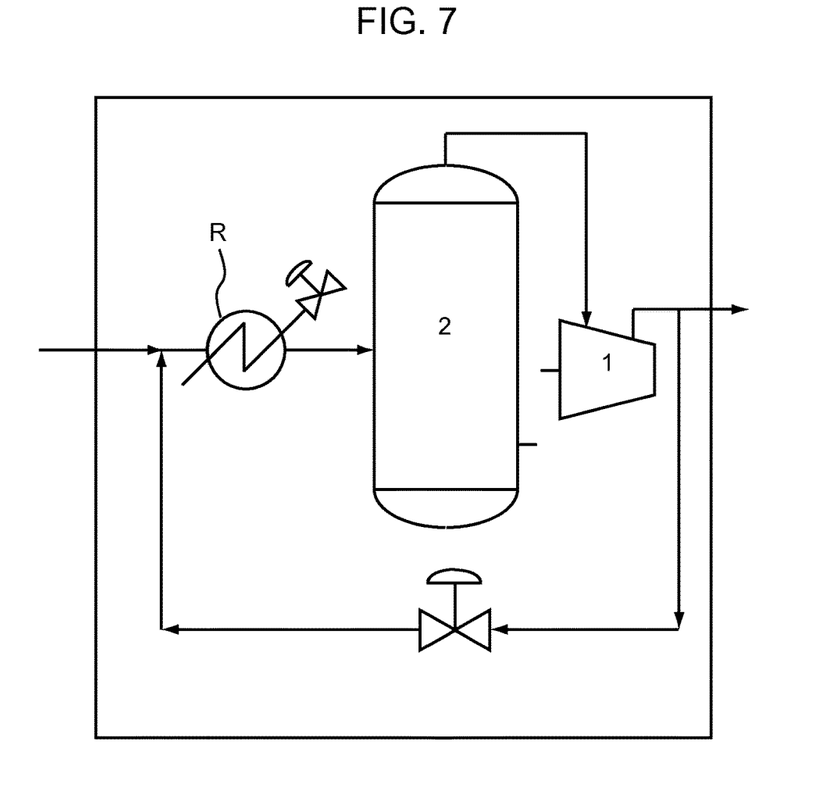
FIGS. 7 and 7A are general diagrams of a procedure of treatment of a gas by means of a motor compressor unit.

FIG. 7 diagrammatically illustrates an industrial procedure.

In FIG. 7, the compressor 1 is supplied with dry gas by the separator 2 and from which the output is looped back to the inlet in order to prevent the pumping of the compressor produced by a reversal of the direction of the flow of liquid in the compressor. In this representation in FIG. 7, the cooling system is positioned upstream of the motor compressor unit.

Figure 7A:
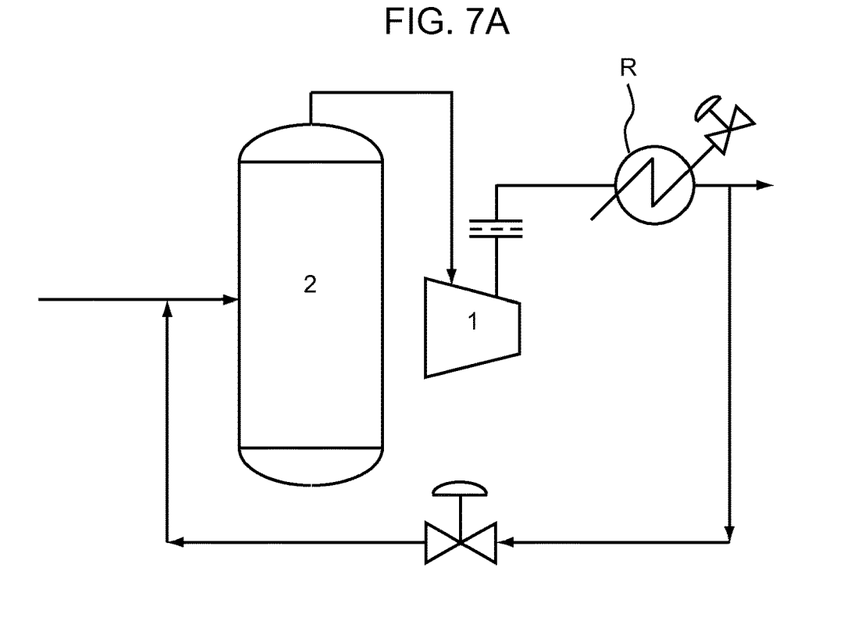

FIG. 7A presents an alternative to the preceding solution, showing the positioning of the cooling system in downstream of the motor compressor unit.

A cooling unit is provided upstream or downstream of the separator for cooling the hot gas issued from the motor compressor 1 (in case of pumping), from a motor compressor located upstream or from another process point.

Figure 8:
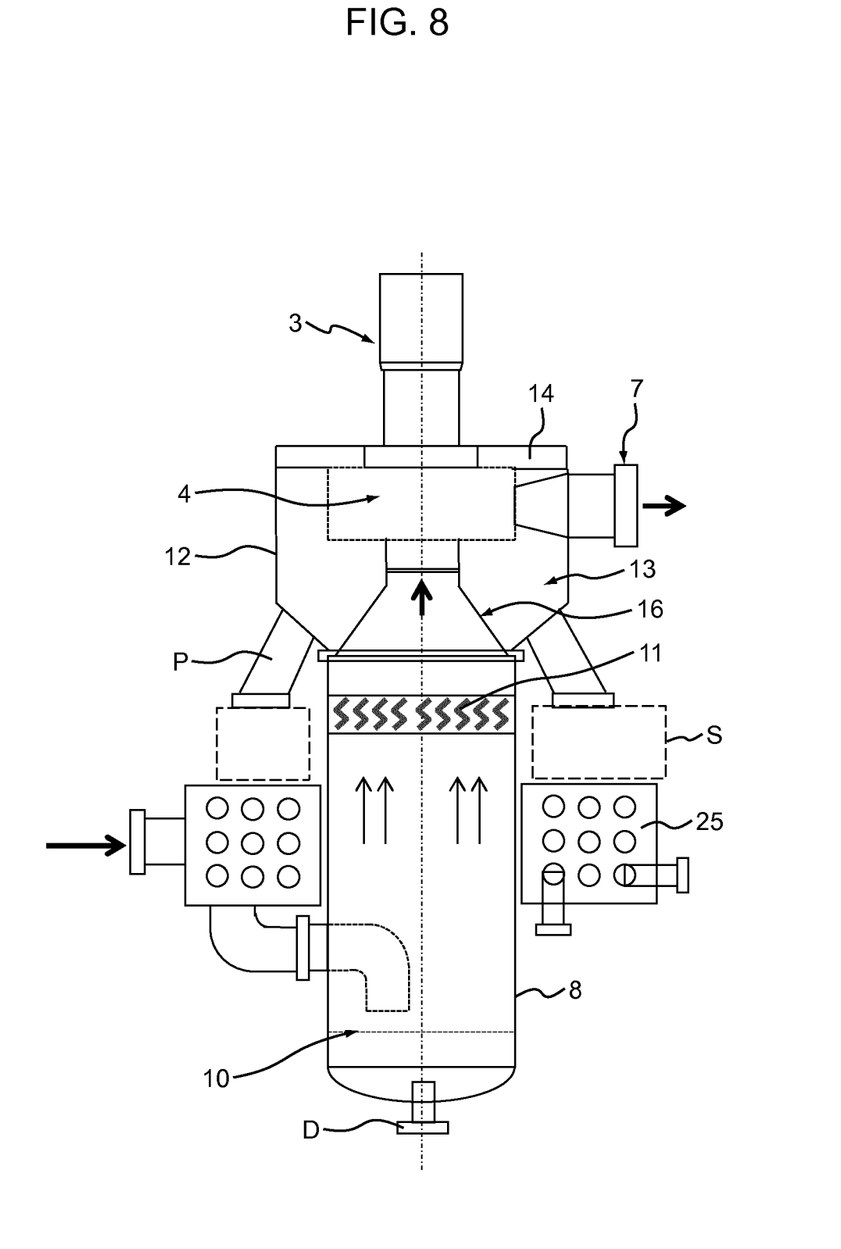
FIG. 8 is an example of implementation of the procedure of FIGS. 7 and 7A by means of a motor compressor unit compliant with the invention.

Referring now to FIG. 8, the motor compressor unit is configured so as to involve the systems ensuring the implementation of the procedure illustrated in FIGS. 7 and 7A. In this example of execution, which corresponds to a radial backflow configuration, and on which we recognized the separator 2 is integrated in the compressor stage 4 run by the electric motor 3, we see that the motor compressor unit is also involved in a cooling stage meant to cool the recirculated gases from the compressor stage 4, a compressor located upstream or from another process point. An anti-pumping valve can also be used on the same frame as the motor compressor unit. However, the cooling device 25 of the cooling stage can also be interlocked in a double casing around separator 2.

Finally, in an advantageous implementation mode, the source of supply of low voltage of the electric motor and the magnetic bearings can also be subject to integration on the same frame, by considering the local security directives and applicable to the gas handled.

Embodiments of the described invention, in which the compressor stage of the motor compressor is integrated in the separator, allows a notable reduction of the control on the ground of all that is constituted by the separator, motor compressor and its auxiliary devices.

The embodiments of the present invention also massively reduce the motor compressor due to the immersion under pressure of the compressor in the separator.

The maintenance is also simplified due to the assembling and disassembling facilities by the modular aspect of the assembling.

By integrating the compressor stage in the separator, the there is a reduction in pressure lost over the length of the piping lines existing in the technical status between the separator and the motor compressor.

Similarly, the control of the anti-pumping of the compressor is facilitated due to the reduction of the backflow volume and the line break of the gas.

What is claimed is:

1. A liquid/gas separator with an integrated compressor, comprising:
    a sump equipped with a first gas separator stage of at least one gas separator stage for separating a humid gas received from outside of the liquid/gas separator into a gaseous phase and a liquid phase, to convert the gaseous phase to a dried gas and send the dried gas toward the posterior direction thereof, and the first gas separator stage is an overall cylindrical part of the sump having one radius, wherein the overall cylindrical part in its entirety functions as the liquid/gas separator by which the humid gas is separated into the gas phase and the liquid phase by at least one of inertia-force and gravity applied to each of the gas phase and the liquid phase contained in the humid gas passing through the cylindrical part,
    wherein the sump comprises a head, as a compartment formed by extending the cylindrical part of the sump itself toward the posterior direction thereof, wherein the head defines a diameter obtained by enlarging the diameter of the cylindrical part of the sump so as to include in the head's interior a motor compressor in its entirety into which the gas phase separated by the gas separator stage is fed as the dried gas flow, and wherein the sump internally includes the compartment defined by the head in which the gaseous phase separated by the separator stage and converted into the dried gas flows into, and in which a compressor stage of the motor compressor configured for receiving at least one part of the separated gaseous phase and compressing the separated gaseous phase can be integrated in its entirety with the sump to output the compressed gaseous phase from the liquid/gas separator itself.

2. The separator of claim 1, wherein the internal volume of the sump is blocked by a blockage slab at one end portion of the sump where the motor compressor is fixed to the sump.

3. The separator of claim 1, wherein the sump comprises therein a diffuser provided at an entry of the compressor stage into which the gaseous phase as the dried gas separated by the gas separator stage flows.

4. The separator of claim 1, further comprising a cooling unit to cool the humid gas at an upstream side of the motor compressor, or at a downstream side of the motor compressor, wherein the cooling unit is provided at a place around the cylindrical part of the sump or inside of the compartment.

5. The separator of claim 1, wherein at least the first gas separator stage of at least one gas separator stage that is the cylindrical part of the sump is positioned vertically.

6. The separator of claim 1, wherein the at least one separator stage comprises a cyclonic separator, a double bend separator, or an inertial separator.

7. The separator of claim 1, wherein the at least one separator stage comprises a first stage and a second stage.

8. The separator of claim 1, further comprising a set of active magnetic bearings axially and radially supporting a shaft line of the motor of the compressor.

9. The separator of claim 1, wherein the compressor is an axial compressor.

10. The separator of claim 1, wherein the motor and the compressor stage are both assembled in a common housing.

11. The separator of claim 1, wherein the compressor is a radial backflow centrifugal compressor and includes a radial output port, all of it including the motor mean and a wheel with compression blades of the compressor constituting a set that can be assembled and disassembled each other.

12. The separator of claim 7, wherein the second stage comprises multiple separation stages.

13. The separator of claim 12, further comprising a perforated slab at an outlet of the upstream of the compressor stage, the perforated slab configured to correct a flow of gaseous fluid flowing therethrough from at least one separation stage of the multiple separation stages.

14. The separator of claim 13, wherein the at least one separator stage is a double bend separator.

* * * * *